Figure 1:
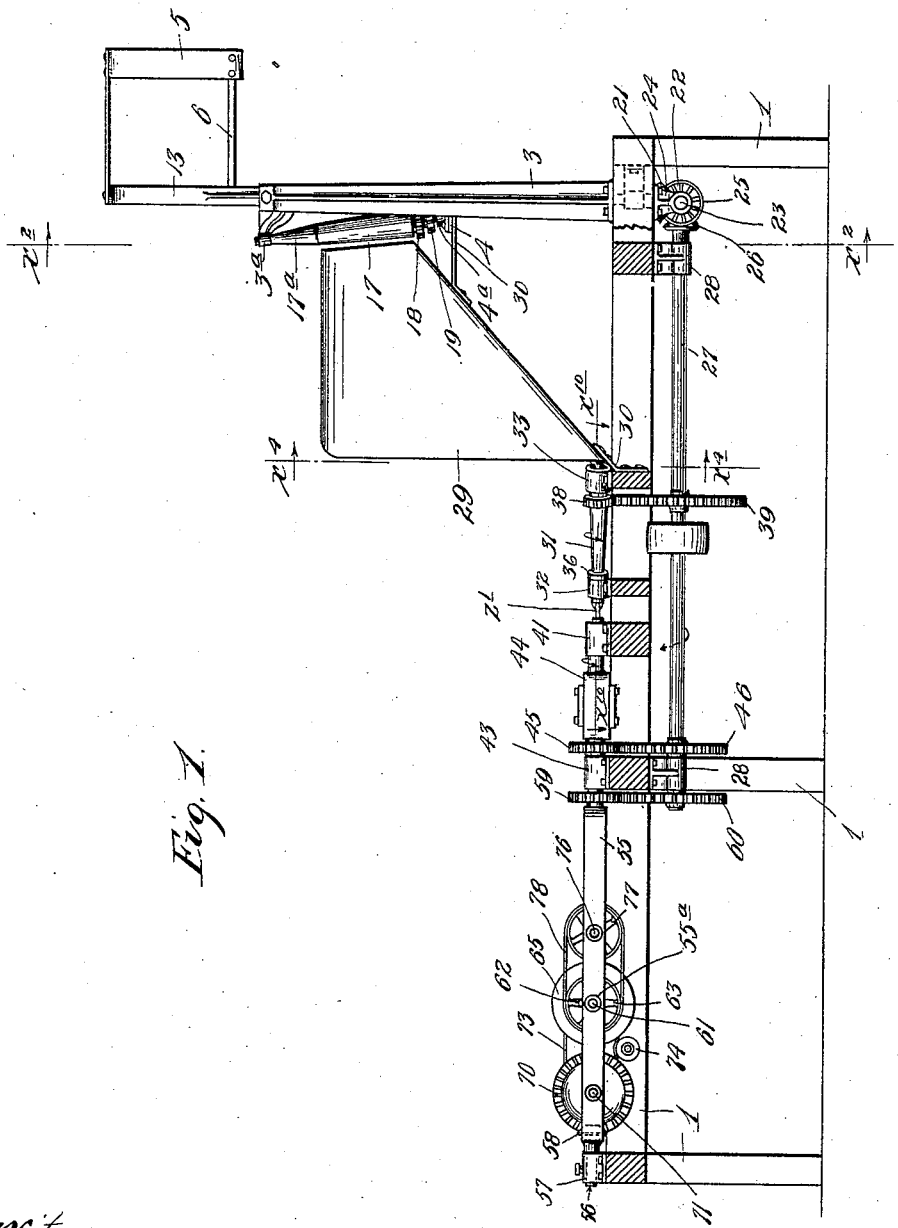

No. 860,978. PATENTED JULY 23, 1907.
T. W. JERREMS.
GRASS TWINE MACHINE.
APPLICATION FILED OCT. 22, 1904.

6 SHEETS—SHEET 1.

Witnesses.
H. S. Kilgore,
E. W. Jeppesen.

Inventor:
Thomas W. Jerrems
By his Attorneys,
Williamson Merchant

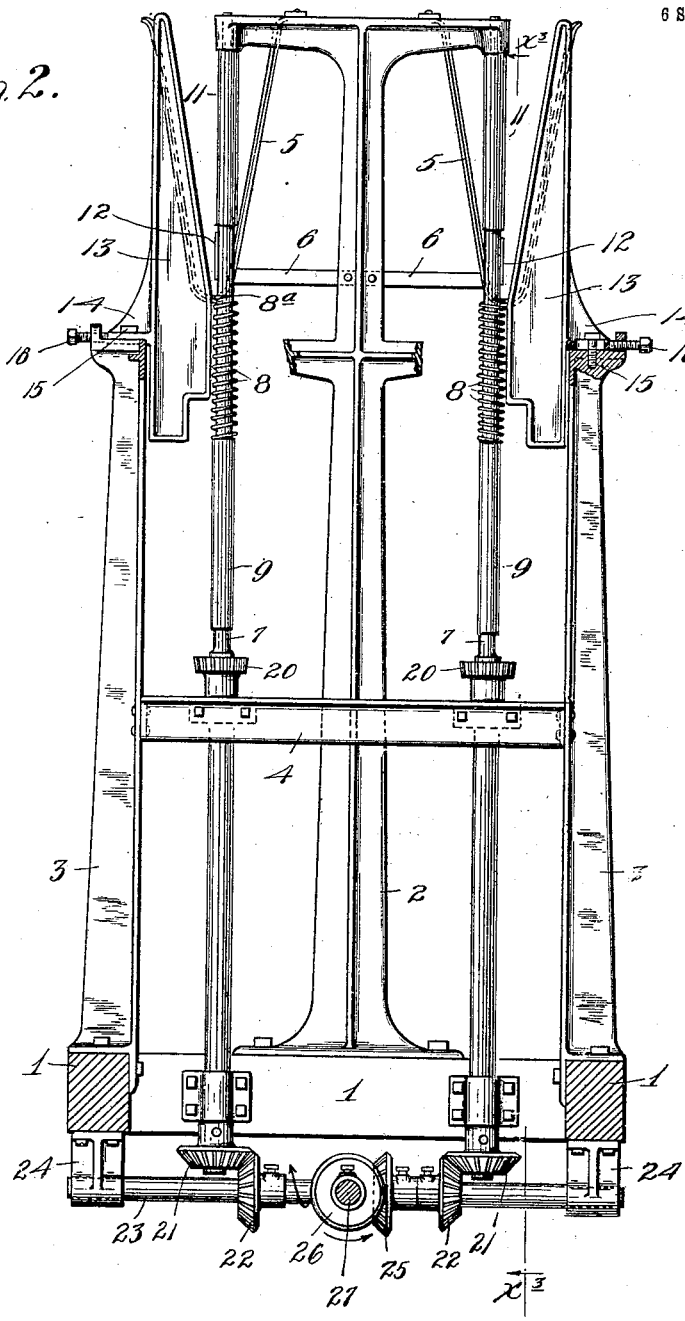

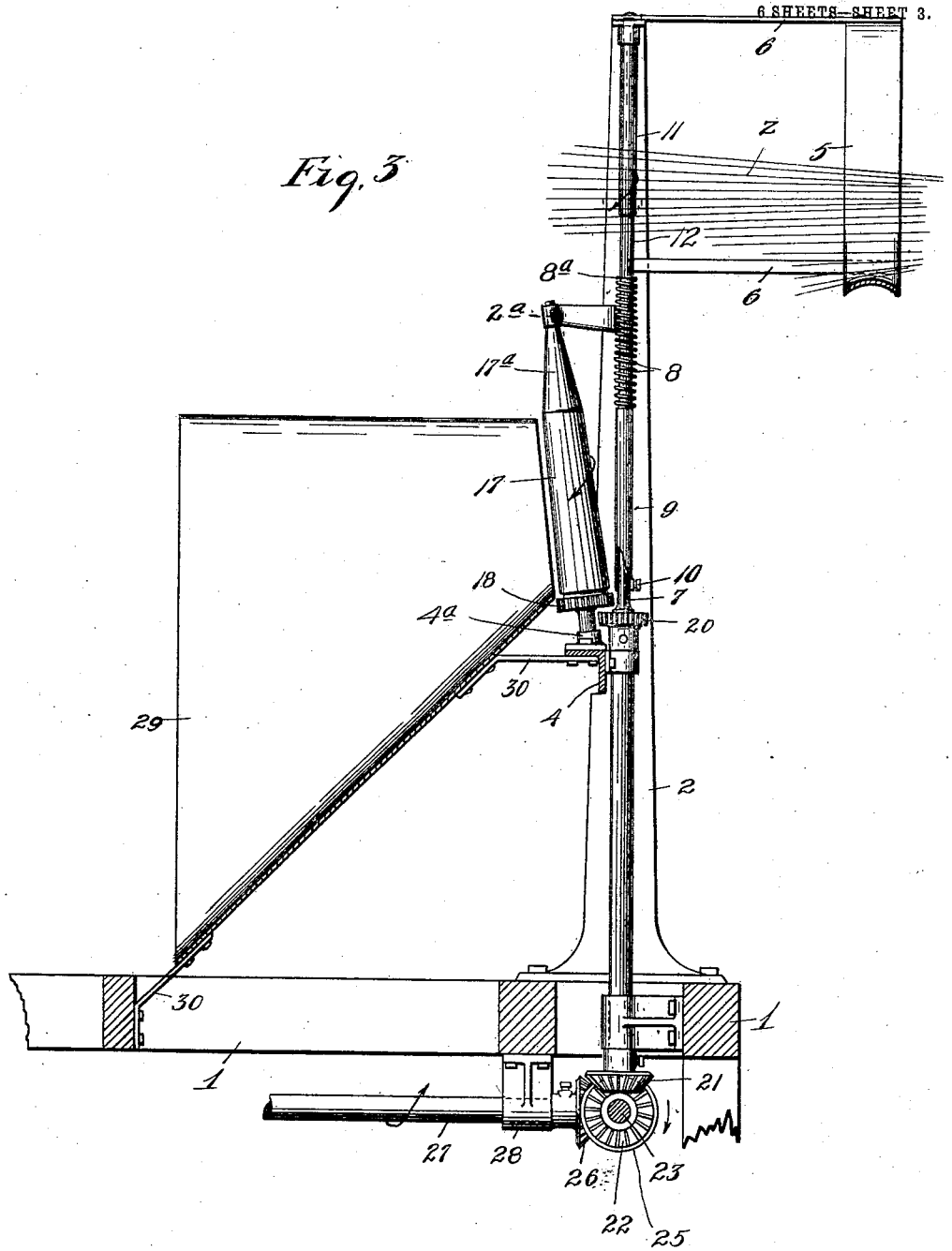

No. 860,978.
PATENTED JULY 23, 1907.
T. W. JERREMS.
GRASS TWINE MACHINE.
APPLICATION FILED OCT. 22, 1904.
6 SHEETS—SHEET 4.
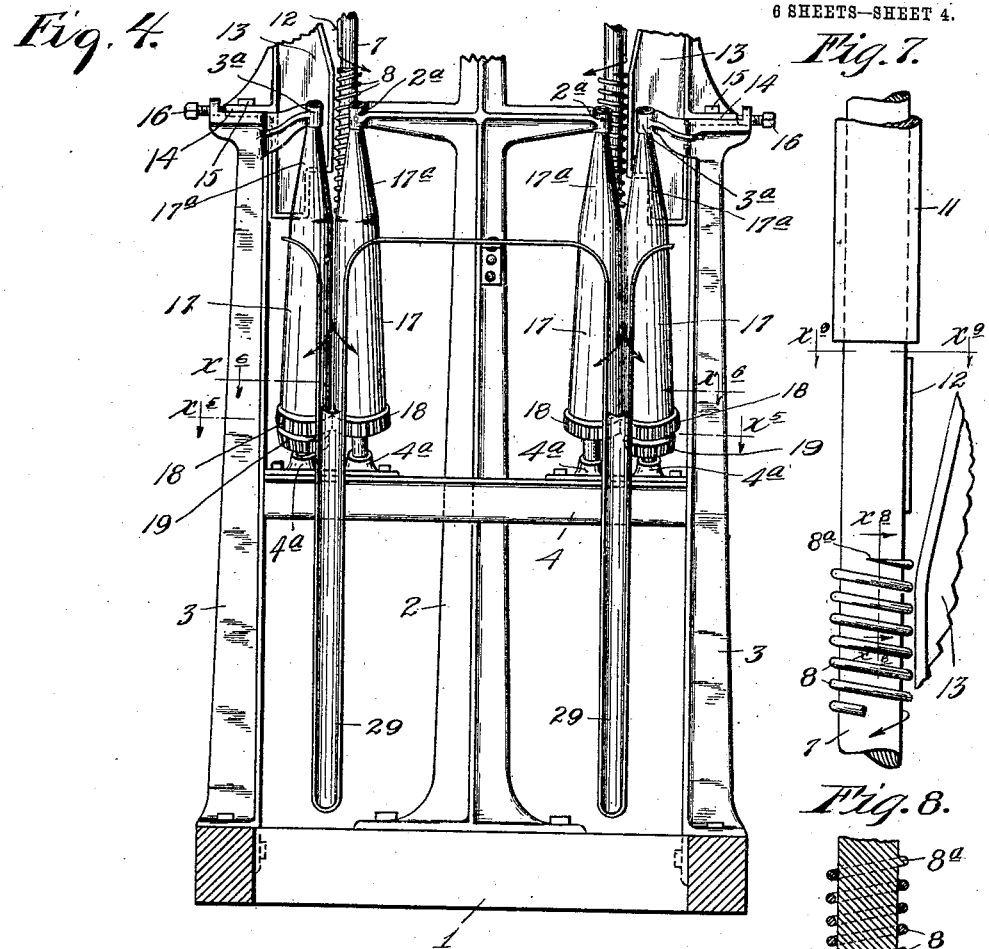
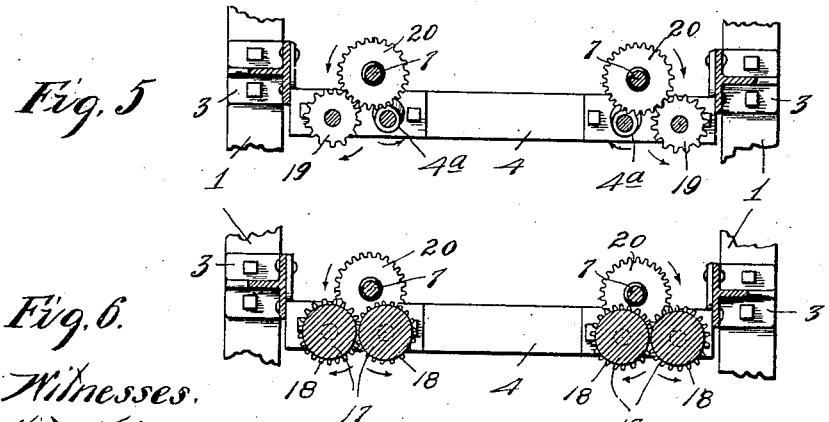
Witnesses.
H. D. Kilgore,
E. W. Jeppesen.
Inventor:
Thomas W. Jerrems,
By his Attorneys,
Williamson Merchant
THE NORRIS PETERS CO., WASHINGTON, D. C.

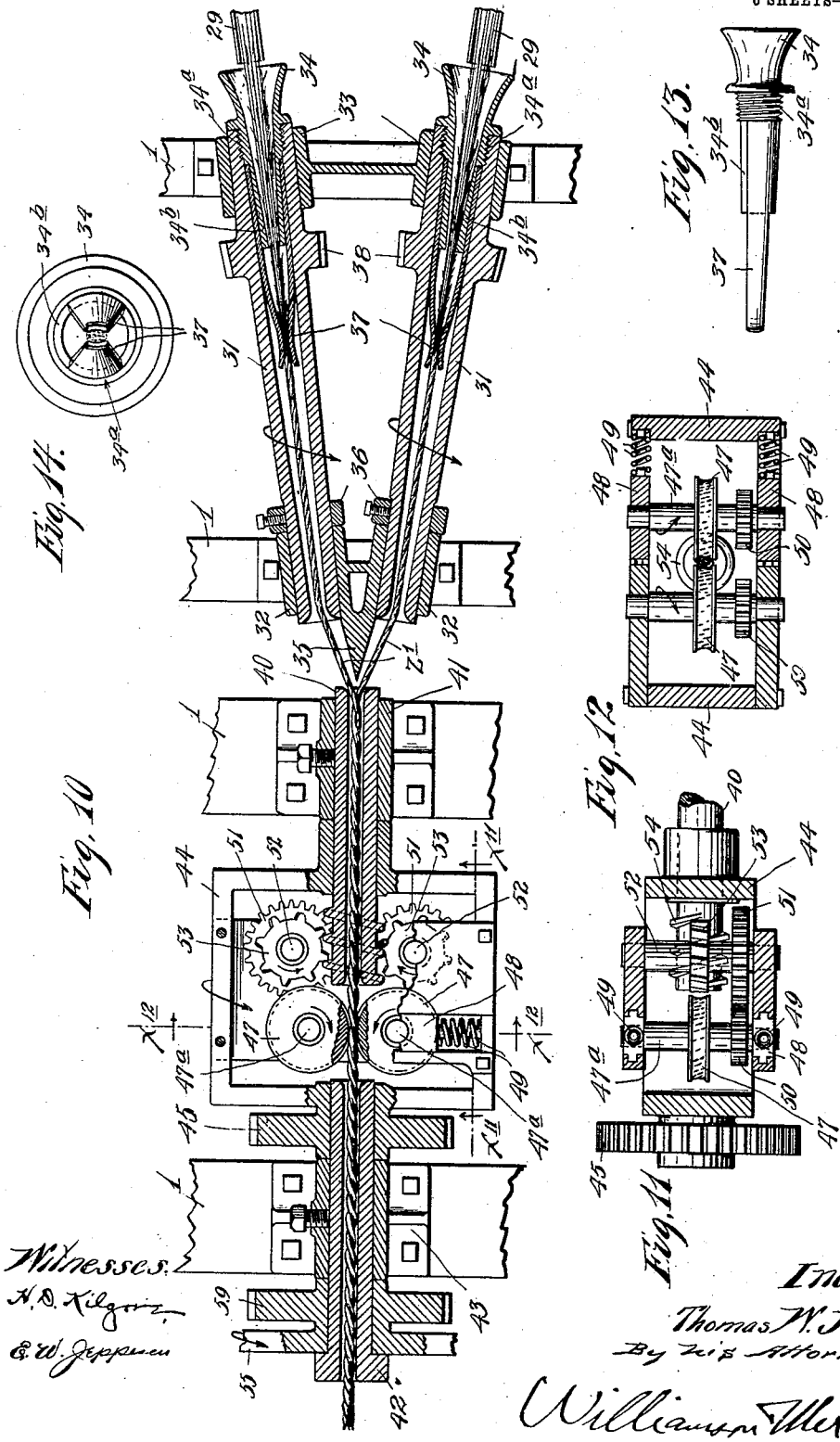

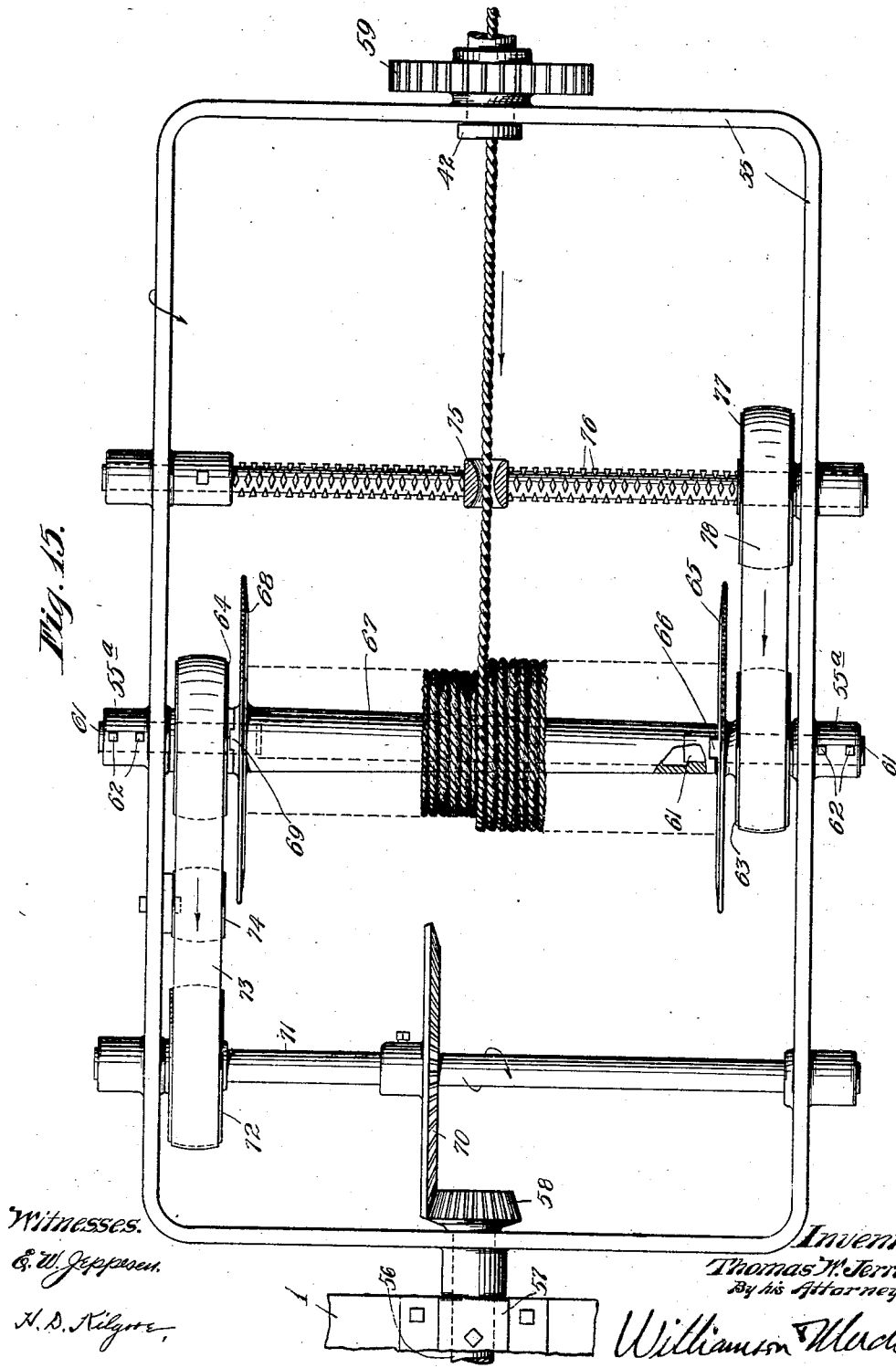

UNITED STATES PATENT OFFICE.

THOMAS W. JERREMS, OF ST. PAUL, MINNESOTA.

GRASS-TWINE MACHINE.

No. 860,978.　　　Specification of Letters Patent.　　　Patented July 23, 1907.

Application filed October 22, 1904. Serial No. 229,548.

*To all whom it may concern:*

Be it known that I, THOMAS W. JERREMS, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

My invention relates to machines for making grass twine, and has for its object to improve the same in point of simplicity of construction, cost, durability, and both quantity and quality of work turned out.

To the above ends, the invention consists of the novel devices and combinations of devices hereinafter described and defined in the claims.

My present invention is directed particularly to improved grass feeding mechanism for selecting the grass blades from a suitable holder, in a regular order of succession, and delivering the same to twine forming mechanism, by the means of which latter, they are twisted together into twine form. The invention, however, further involves other features of construction and combinations of parts, all of which will be hereinafter described and defined in the claims.

The improved machine is illustrated in the accompanying drawings, wherein like characters indicate like parts throughout the several views.

Referring to the drawings, Figure 1 is a view, principally in side elevation, but with some parts sectioned, showing a machine designed in accordance with my invention. Fig. 2 is a transverse vertical section taken on the line $x^2 \, x^2$ of Fig. 1. Fig. 3 is a vertical section taken from the front toward the rear of the machine on the line $x^3 \, x^3$ of Fig. 2, some parts being broken away. Fig. 4 is a transverse vertical section, taken on the line $x^4 \, x^4$ of Fig. 1, some parts being broken away. Fig. 5 is a detail in horizontal section, taken on the line $x^5 \, x^5$ of Fig. 4, some parts being broken away. Fig. 6 is a detail in horizontal section, taken on the line $x^6 \, x^6$ of Fig. 4, some parts being broken away. Fig. 7 is a detail, on an enlarged scale, corresponding in the direction in which it is viewed, to Fig. 2, and showing one of the spiral grass selectors, and coöperating guide plate, parts being broken away. Fig. 8 is a detail in vertical section, taken on the line $x^8 \, x^8$ of Fig. 7. Fig. 9 is a detail in horizontal section, on the line $x^9 \, x^9$ of Fig. 7. Fig. 10 is a horizontal section, taken on the line $x^{10} \, x^{10}$ of Fig. 1. Fig. 11 is a vertical section, taken on the line $x^{11} \, x^{11}$ of Fig. 10. Fig. 12 is a transverse vertical section, taken on the line $x^{12} \, x^{12}$ of Fig. 10. Fig. 13 is an elevation, showing in detail, one of the funnel heads and twisting fingers of one of the twisting devices. Fig. 14 is an end elevation of one of the twisting devices; and Fig. 15 is a plan view of the so-called "reeling mechanism".

In the machine as illustrated in the drawings, all of the running parts are supported, directly or indirectly, by a rectangular frame 1, to the forward end of which are rigidly secured three bearing pedestals 2—3—3, said pedestals being rigidly tied together, at their intermediate portions, by a tie bar 4.

To hold the grass in straight, loosely compacted, but parallel, arrangement, suitable grass holders are provided. These grass holders are, as shown, afforded, in part, by V-shaped metallic straps or crotches 5 that are supported by bars 6 from the upper portion of the central pedestal 2 (see Figs. 1, 2 and 3).

*Grass-feeding mechanism.*—Mounted in suitable bearings on the frame 1, on the tie bar 4, and on the upper end of the central pedestal 2, is a pair of vertically disposed parallel shafts 7. These shafts 7 are located a considerable distance forward of the corresponding holder straps or crotches 5, and they stand approximately in line longitudinally of the machine, with the depending lower portions thereof. Around each shaft 7 is placed a spiral grass selector, in the form of a coiled spring 8, the upper end of which is brought to a sharp knife-edge point $8^a$, that is located preferably in horizontal line with the lower portion of the corresponding holder crotch 5, as best shown in Figs. 2, 7, 8 and 9. This sharpened or pointed end $8^a$ of the spring 8 is brazed or otherwise rigidly secured to the corresponding shaft 7, but the rest of said spring is loose therefrom, to afford means for adjusting the feed, as will hereinafter appear. Secured on each shaft 7, below its spring or spiral selector 8, is a sleeve 9 which, as shown, is made adjustable by a set screw 10. The upper end of this sleeve 9 engages the lower end of the spring 8, and by longitudinal adjustments of said sleeve on said shaft, the pitch of the spring 8, that is, the distance between the coils thereof, may be varied. Surrounding the upper portion of each shaft 7 is a non-rotary sleeve 11, the upper end of which, as shown, is rigidly secured to the expanded head of the pedestal 2. Between the lower ends of the sleeves 11 and the upper ends of the corresponding springs 8, the shafts 7 are preferably provided with key-like agitating projections or ribs 12 that serve to agitate or shake up the grass blades and insure the free feeding action thereof.

For coöperation with each spiral selector or spring 8, is a vertically disposed guide, as shown, in the form of a tapered bar 13 having a slotted flange 14 which is clamped to the upper end of the corresponding pedestal 3, by a screw bolt 15, and is subject to a thrust screw 16. By adjustments of the thrust screw 16, the guide bar 13 may be adjusted edgewise with respect to the coöperating spring or selector 8. The inclined upper portions of the guide bars 13, and the non-rotary sleeves 11 and portions of the shafts 7, coöperate with the holder crotches 5 to hold the grass blades in straight parallel and loosely compacted arrangement, with the butt ends of the lower blades resting on the upper extremities of the spiral selectors 8.

The spiral selectors or springs 8, and other coöperating parts described, constitute what may be properly designated as "primary feed devices." So-called "secondary feed devices", in the form of pairs of upright coöperating feed rollers, having axially converging upper end surfaces, receive the grass blades from the primary feed devices noted. These feed rollers are designated by the numeral 17, and at their reduced upper ends, they are loosely journaled in bearings $2^a$ and $3^a$ formed respectively on the pedestals 2 and 3, while at their lower ends, they are journaled in bearings $4^a$ on the tie bar 4. The coöperating rollers are geared to run together and to turn in reverse directions, as indicated by arrows marked thereon in Figs. 3 and 4, by means of intermeshing gears 18, shown also in Fig. 6. The upper portions of the rollers 17 are formed conical, as indicated at $17^a$. These conical sections $17^a$ provide the rollers with coöperating surfaces that form crotches in which the butt ends of the grass blades may be forced, under the action of the spiral selector 8.

In Fig. 3, the grass blades are indicated by the character $z$, and it will be noted that when properly positioned within the respective grass holders, they directly overlie the diverging conical ends of the said rollers, with their butt ends in position to be delivered thereto by direct downward lateral movement.

Each outer roller 17, below its gear 18, carries a gear 19 that meshes with a gear 20 on the corresponding feed shaft 7 (see Figs. 3, 4 and 5.) The shafts 7, at their lower ends (see Figs. 2 and 3) are provided with miter gears 21 that mesh with miter gears 22 on a transverse countershaft 23, mounted in suitable bearings 24 on the machine frame 1. The countershaft 23 carries another miter gear 25 that meshes with a miter gear 26 carried by a long countershaft 27, mounted in bearings 28 on the frame 1, and extending longitudinally thereof.

*Twine-forming mechanism.*—The grass blades which are fed endwise by the secondary feed devices, to wit, the rollers 17, are delivered into inclined guide spouts 29 (see Figs. 1, 3 and 4) that are rigidly supported, as shown, by metallic straps 30 from the frame 1 and from the tie bar 4. Each of these guide spouts 29 delivers to one of a pair of primary rotary twisters, and the two primary twisters deliver the strands which they twist to a common secondary twister. The primary twisters, in the construction illustrated, involve rotary sleeves or tubular spindles 31 that are mounted in suitable bearings 32 and 33 on the frame 1, and are provided with funnel-like receiving heads 34. The spindles 31 converge toward the rear of the machine, and between them, at their converging delivering ends, is a fixed wedge-like anvil block 35 which, as shown, is integral with the bearings 32. Thrust collars 36, fixed on the spindles 31, press against the bearing 32. The heads 34 are provided with screw-threaded shanks $34^a$ that are screwed into the ends of the spindles 31, and are provided with reduced tubular extensions $34^b$, to which are rigidly secured the forward ends of a pair of spring blade twisting fingers 37 (see particularly Figs. 10, 13 and 14). The free ends of the so-called twisting fingers 37 are slightly concavo-convex in cross section, so that they form a good guide for the twisted strands of twine which they are acting upon. The hollow spindles 31 carry bevel pinions 38 that mesh with a large gear 39 which is carried by the long countershaft 27 before noted. Under the rotation of the shaft 27 in the direction indicated by the arrow marked thereon in Fig. 1, the two hollow spindles 31 will be rotated in the direction indicated by the arrows marked thereon in Figs. 1 and 10.

From the sleeves 31 of the primary twisters, the two twisted strands $z^1$ are deliverd into a non-rotary sleeve 40 which, as shown, is rigidly secured to a bearing 41 on the frame 1 (see particularly Fig. 10). A similar non-rotary sleeve 42, is secured in a bearing 43 on the frame 1 and is axially alined with, but spaced apart from, the non-rotary sleeve 40. A rectangular gear case or carrier 44, is mounted to rotate on the non-rotary sleeves 40 and 42, between the bearings 41 and 43, and on one hub it is provided with a spur gear 45 that meshes with a spur gear 46 carried by the shaft 27. The rotary carrier 44 carries a pair of grooved drawing wheels 47, the abutting peripheries of which stand in position to engage and act upon that portion of the twine which is exposed between the two non-rotary sleeves 40 and 42. One of the wheels 47 is movable with respect to the other, and its trunnions $47^a$ are engaged by sliding bearings 48 which are slidably mounted in the side plates of the rotary carrier 44, and are subject to springs 49, which springs press the two wheels together. On the trunnions $47^a$ of the draw wheels 47 are pinions 50 that mesh with spur gears 51 (see Fig. 11) carried by short shafts 52 mounted in the side plates of the carrier 44, and provided with worm gears 53 that mesh with a worm 54 formed on the rear end of the non-rotary sleeve 40.

The carrier 44 receives rotary motion from the shaft 27, through the gear 46 and pinion 45, and when it is thus rotated, the draw wheels 47, gears 51 and worm gears 53, are caused to revolve around the common axis of the non-rotary sleeves 40 and 42. Hence, under this motion, the worm gears, acting on the worm 54, will rotate the shafts 52 and, through the gears 50 and 51, will rotate the two draw wheels 47, in the direction indicated by the arrows marked thereon in Fig. 10. The draw wheels, by the revolution around the axis of the non-rotary guide sleeves, will twist together the two strands of twisted grass delivered thereto from the primary twisters, and by rotation on their own axes, will draw or feed the twisted twine endwise through the machine. By noting the arrows marked on Fig. 10, it will be seen that both of the primary twisters, and the common secondary twister, rotate in the same direction.

*Reeling mechanism.*—A large rectangular frame 55 is mounted to rotate on the rear end of the non-rotary sleeve 42 and on a non-rotary shaft or stud 56 which is held by a bearing 57, secured on the frame 1, and is provided, within said frame, with a bevel pinion 58. The shaft 56 is located in axial alinement with the sleeve 42, and the frame 55, on its forward end hub, is provided with a spur gear 59 that meshes with a spur gear 60 on the long countershaft 27. Hence rotary motion will be imparted from the shaft 27 to said frame 55, through the gears 59 and 60. Extending transversely of the frame 55, and mounted in bearings $55^a$ of said frame, is a pair of stub shafts 61 which are rigidly secured to said bearings by set screws 62, or other devices, which when loosened, permit the said shafts to be slid endwise. Loosely mounted on one of said shafts 61 is a pulley 63, and loosely mounted on the other shaft is a pulley 64. Rigidly secured to the hub of the pulley 63 is a disk-like head 65 having, on its inner face, and near its hub, projecting lugs 66. The numeral 67 indicates a windlass spindle which, at one end, is provided with a disk-like head 68, and with a lug 69 on its hub, outward of said disk. This spindle 67 has seats at its ends into which the ends of the stub shafts 61 are adapted to be inserted, to hold the same in working position. When the said spindle is applied in working position, its lug 69 engages a seat in the hub of the pulley 64, and the lug 66 carried by the pulley 63, engages a seat in its other end. When the said parts are put together as shown in Fig. 15, the two pulleys 63 and 64, the spindle 67 and the heads 65 and 68, are connected to rotate together, and the said spindle 67, and the two heads 65 and 68, make up a complete drum or spool, onto which the completed twine is wound.

The pinion 58 of the non-rotary shaft 56, meshes with a bevel gear 70 carried by a transverse counter shaft 71 mounted in bearings on the sides of the rotary frame 55, and provided with a pulley 72. A belt 73 runs over the pulley 72 and over the pulley 64, and over a tightening pulley 74, which latter pulley is mounted on one side of the frame 55.

The completed twine, on its way from the guide sleeve 42 to the drum or spool upon which it is to be wound, passes through a traveling guide 75 which is mounted on a reversely threaded shaft 76, mounted in suitable bearings on the sides of the rotating frame 55. This shaft, and the guide 75, operate in the usual way to spread out the twine in even layers over the spool, and for the purposes of this case, the well known means for automatically reversing the travel of said guide need not be considered. Said shaft 76 is provided with a pulley 77, over which, and the heretofore noted pulley 63, a belt 78 runs, to impart motion to the said shaft.

*Operation.*—The operations of the machine, summarized, is as follows: For each rotation of the feed shaft 7, the sharp upper point or edge 8ª of the spiral selector afforded by the spring 8 takes up one or more blades of grass from the bottom of the loose bundle contained in the holder and starts the same on downward under a lateral movement, and continues such movements of the butt ends of the blades until they are forced first between the conical ends 17ª, and then between the body portions of the feed rollers 17. Of course, the distance between the point or edge 8ª and the immediate underlying coil of the spring 8 will determine the amount of grass or number of blades that will be fed laterally downward from the roller for each rotation of the shaft 7. Hence it is evident that the rate of feed may be varied by closing up or letting out the spring 8. For instance, by moving upward the sleeve 9 on shaft 7, the spring 8 may be shortened and the coils thereof forced more closely together, thereby decreasing the rate of feed of the grass per rotation of the shaft 7. It will thus be seen that the spring 8 is really a variable pitched screw which operates as a grass selector. It may be here stated that the screw or spiral selector afforded by said spring 8 should have threads of such depth that the grass blades contained between the threads will not be pinched between the shafts 7 and the vertical edge of the guide bar 13, and said grass blades thereby prevented from being fed endwise, as they are moved laterally downward to the rollers 17 of the secondary feed device. The grass blades which are engaged by the rollers 17 will be fed endwise into the inclined feed spouts 29, and by the latter, will be directed into the funnel-like heads 34, and thence through the bodies of the tubular spindles 31 of the primary twisters, and by the action of the spring fingers 37, will be twisted into two strands. The two strands are brought together at the receiving end of the non-rotary sleeve 40, and are twisted together and drawn toward the rear of the machine by the draw wheels 47 of the secondary twister. The wedge-shaped anvil block 35 prevents the two strands from being twisted together outward of the receiving end of the said sleeve 40.

The manner in which the completed twine will be wound onto the receiving spool of the reel mechanism has already been described.

When the spool of the reeling mechanism has been filled, the machine should be stopped and the said spool, that is, the spindle 67 and head 68, may be readily removed, simply by drawing the stub shafts 61 axially outward. The coil of completed twine having been removed from the spool, the said spool is again placed in working position, and the machine is then again ready for action.

The twine formed by the machine as above described, is made of two strands, but the number of strands may be varied by the proper addition or elimination of mechanism. The twine is formed entirely of grass, and without the use of wrapping thread. A cheap twine is thus produced which, for a great many purposes, is better than the thread-wrapped twine.

From what has been said, it will be understood that the mechanism described is capable of a large range of modification within the scope of my invention as herein set forth and claimed.

1. In a grass feeding mechanism, the combination with a grass holder, of a rotary spiral selector arranged to feed the grass blades from said holder, by a lateral movement, substantially as described.

2. In a grass feeding mechanism, the combination with a grass holder, of an upright spiral selector operative to select and feed laterally downward the grass blades from said holder, substantially as described.

3. In a grass feeding mechanism, a rotating shaft and an adjacent guide, said shaft having spiral threads of such depth that they will feed the grass blades laterally, without imparting endwise movements thereto, substantially as described.

4. In a grass feeding mechanism, a variable pitch rotating spiral feed device, substantially as described.

5. In a grass feeding mechanism, the combination with a rotating shaft and a coöperating guide, of a spiral spring, surrounding said shaft, having one end sharpened and rigidly secured to said shaft, and operating as a spiral grass feeding device, substantially as described.

6. In a grass feeding mechanism, the combination with a rotating shaft, and a coöperating guide, of a spiral spring surrounding said shaft, having one end sharpened and rigidly secured to said shaft, but with its main body portion loose from said shaft, and means for compressing and letting out said spring to vary the pitch thereof, substantially as described.

7. In a grass feeding mechanism, the combination with a grass holder, of a rotary shaft, and a coöperating guide, said shaft having a spiral spring secured thereto at one end, and having a longitudinally adjustable sleeve against which the free end of said spring reacts, substantially as described.

8. The combination with a downwardly converging grass holder, of a vertical rotary shaft and an adjacent guide, said shaft having a spiral selector and an agitating projection operating on the grass blades at or near the bottom of the holder, substantially as described.

9. In a grass feeding mechanism, the combination with a grass holder, of a rotary vertical shaft, having a spiral selector operative on the grass blades at or near the bottom of the holder, a non-rotary sleeve surrounding said shaft, above said spiral selector, of an upright guide extending close to and parallel with that portion of said shaft which carries said spiral selector and with its upper portion diverging from said non-rotary sleeve and coöperating therewith, to hold the grass, substantially as described.

10. In a grass feeding mechanism, the combination with an upright rotary shaft, having a spiral selector, of a coöperating guide for the grass blades, mounted for adjustment toward and from said shaft and said spiral selector, substantially as described.

11. In a machine of the character described, the combination with a pair of converging rotary twisters, and means for delivering grass blades thereto, of a revolving reel, a pair of non-rotary sleeves, through which both of the twisted strands of the twine are drawn on the way from said twisters to said windlass, one of said sleeves having a worm, a gear carrier mounted to rotate on said two sleeves, means for rotating the same, a pair of coöperating drawing wheels mounted on said gear carrier and engageable with the twine and worm gears on said carrier, meshing with said worm and geared to said drawing wheels, substantially as described.

In testimony whereof I affix my signature in presence of two witnesses.

THOMAS W. JERREMS.

Witnesses:
ROBERT C. MABEY,
F. D. MERCHANT.